United States Patent
Faulkinbury

(10) Patent No.: US 10,337,732 B2
(45) Date of Patent: Jul. 2, 2019

(54) CONSUMABLE TIP BURNERS, SUBMERGED COMBUSTION MELTERS INCLUDING SAME, AND METHODS

(71) Applicant: JOHNS MANVILLE, Denver, CO (US)

(72) Inventor: Albert Patrick Faulkinbury, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 96 days.

(21) Appl. No.: 15/246,705

(22) Filed: Aug. 25, 2016

(65) Prior Publication Data
US 2018/0058688 A1    Mar. 1, 2018

(51) Int. Cl.
*F23D 14/58*    (2006.01)
*F23D 14/22*    (2006.01)
(Continued)

(52) U.S. Cl.
CPC .............. *F23D 14/58* (2013.01); *C03B 5/167* (2013.01); *C03B 5/1675* (2013.01);
(Continued)

(58) Field of Classification Search
CPC .......... F23D 14/22; F23D 11/36; F23D 14/20; F23D 14/58; C03B 5/2356; C03B 5/2353;
(Continued)

(56) References Cited

U.S. PATENT DOCUMENTS 1,706,857 A    3/1929   Mathe
2,012,067 A *  8/1935   Mayo ................. F24D 19/1066
                                                       236/9 A
(Continued)

FOREIGN PATENT DOCUMENTS

CN    202329916 U    7/2012
DE    37 10 244 A1   6/1989
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Jodi C Franklin
(74) *Attorney, Agent, or Firm* — Robert D. Touslee

(57) ABSTRACT

Combustion burners, burner panels, submerged combustion melters including the panels, and methods of using the same are disclosed. In certain embodiments, the burner includes an annular liquid cooled jacket defining a central longitudinal through passage. An inner conduit is positioned substantially concentrically within an outer conduit, the latter positioned in the through passage, each conduit comprising proximal and distal ends, the conduits configured so that the outer and inner conduits are movable axially. The inner conduit forms a primary passage and the outer conduit forms a secondary passage between the outer conduit and the inner conduit. In one embodiment the outer conduit has an exterior surface configured along at least a portion thereof with threads mating with adjacent threads on an inner surface of the annular liquid cooled jacket. Other embodiments including lock and release dogs or bolt arrangements. The burners promote burner life and melter campaign length.

11 Claims, 9 Drawing Sheets

(51) Int. Cl.
*C03B 5/235* (2006.01)
*F23D 14/78* (2006.01)
*C03B 5/167* (2006.01)

(52) U.S. Cl.
CPC ............ *C03B 5/2356* (2013.01); *F23D 14/22* (2013.01); *F23D 14/78* (2013.01); *C03B 2211/70* (2013.01); *F23D 2206/0021* (2013.01); *Y02E 20/366* (2013.01)

(58) Field of Classification Search
CPC ............. C03B 2211/23; C03B 2211/22; C03B 2211/60
See application file for complete search history.

(56) References Cited

U.S. PATENT DOCUMENTS

| | | | |
|---|---|---|---|
| 2,174,533 A | 10/1939 | See et al. | |
| 2,118,479 A | 1/1940 | McCaskey | |
| 2,269,459 A | 1/1942 | Kleist | |
| 2,321,480 A | 6/1943 | Gaskell | |
| 2,432,942 A | 12/1947 | See et al. | |
| 2,455,907 A | 1/1948 | Slayter | |
| 2,679,749 A | 6/1954 | Poole | |
| 2,718,096 A | 9/1955 | Henry et al. | |
| 2,773,545 A | 12/1956 | Petersen | |
| 2,781,756 A | 2/1957 | Kobe | |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,237,929 A | 3/1966 | Plumat et al. | |
| 3,241,548 A | 3/1966 | See et al. | |
| 3,248,205 A | 4/1966 | Dolf et al. | |
| 3,249,663 A * | 5/1966 | Dressler .................. F27B 9/243 264/606 | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,339,616 A | 5/1967 | Ward, Jr. et al. | |
| 3,325,298 A | 6/1967 | Brown | |
| 3,347,660 A | 10/1967 | Smith et al. | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,421,873 A | 1/1969 | Burgman et al. | |
| 3,432,399 A | 3/1969 | Schutt | |
| 3,445,214 A | 5/1969 | Oremesher | |
| 3,498,779 A | 3/1970 | Hathaway | |
| 3,510,393 A | 5/1970 | Burgman et al. | |
| 3,525,674 A | 8/1970 | Barnebey | |
| 3,533,770 A | 10/1970 | Adler et al. | |
| 3,563,683 A | 2/1971 | Hess | |
| 3,592,151 A | 7/1971 | Webber | |
| 3,592,622 A * | 7/1971 | Shepherd ............. C03B 5/2353 65/136.3 | |
| 3,592,623 A | 7/1971 | Shepherd | |
| 3,606,825 A | 9/1971 | Johnson | |
| 3,617,234 A | 11/1971 | Hawkins et al. | |
| 3,627,504 A | 12/1971 | Johnson et al. | |
| 3,692,017 A | 9/1972 | Glachant et al. | |
| 3,717,139 A | 2/1973 | Guillet et al. | |
| 3,738,792 A | 6/1973 | Feng | |
| 3,746,527 A | 7/1973 | Knavish et al. | |
| 3,747,568 A | 7/1973 | Malmin | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,818,893 A | 6/1974 | Kataoka et al. | |
| 3,835,909 A | 9/1974 | Douglas et al. | |
| 3,840,002 A | 10/1974 | Douglas et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,083,711 A | 4/1978 | Jensen | |
| 4,097,028 A | 6/1978 | Langhammer | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,226,564 A | 10/1980 | Takahashi et al. | |
| 4,238,226 A | 12/1980 | Sanzenbacher et al. | |
| 4,249,927 A | 2/1981 | Fakuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,323,718 A | 4/1982 | Buhring et al. | |
| 4,349,376 A | 9/1982 | Dunn et al. | |
| 4,406,683 A | 9/1983 | Demarest | |
| 4,413,882 A | 11/1983 | Bailey et al. | |
| 4,483,672 A * | 11/1984 | Wallace .................. F23N 5/105 126/116 A | |
| 4,488,537 A | 12/1984 | Laurent | |
| 4,539,034 A | 9/1985 | Hanneken | |
| 4,542,106 A | 9/1985 | Sproull | |
| 4,545,800 A | 10/1985 | Won et al. | |
| 4,548,194 A * | 10/1985 | Schafer .................... F23B 1/16 110/101 R | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,693,740 A | 9/1987 | Noiret et al. | |
| 4,735,642 A | 4/1988 | Jensen et al. | |
| 4,738,938 A | 4/1988 | Kunkle et al. | |
| 4,758,259 A | 7/1988 | Jensen | |
| 4,798,616 A | 1/1989 | Knavish et al. | |
| 4,814,387 A | 3/1989 | Donat | |
| 4,816,056 A | 3/1989 | Tsai et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,919,700 A | 4/1990 | Pecoraro et al. | |
| 4,927,886 A | 5/1990 | Backderf et al. | |
| 4,953,376 A | 9/1990 | Merlone | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,199,866 A * | 4/1993 | Joshi ..................... C03B 5/2353 239/416 | |
| 5,204,082 A | 4/1993 | Schendel | |
| 5,209,893 A * | 5/1993 | Askin ....................... F23C 5/06 266/223 | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |

(56) References Cited

U.S. PATENT DOCUMENTS

| | | | |
|---|---|---|---|
| 5,449,266 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A * | 8/1999 | Feldermann ............ F23C 7/002 239/399 |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,461 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,666 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,645,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 9,926,219 B2 * | 3/2018 | Charbonneau ........ C03B 37/022 |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 * | 11/2002 | Jeanvoine ............... C03B 5/225 65/134.5 |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 * | 2/2005 | Masi ..................... F23D 11/108 431/187 |
| 2005/0039491 A1 | 2/2005 | Maugendre et al. |
| 2005/0083989 A1 | 4/2005 | Leister et al. |
| 2005/0103323 A1 | 5/2005 | Engdal |
| 2005/0236747 A1 * | 10/2005 | Rue ....................... C03B 5/2356 266/217 |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |

(56) References Cited

U.S. PATENT DOCUMENTS

| | | |
|---|---|---|
| 2007/0220922 A1 | 9/2007 | Bauer et al. |
| 2007/0246869 A1 | 10/2007 | Rymarchyk et al. |
| 2008/0006326 A1* | 1/2008 | Cottell ............... F17D 1/17 |
| | | 137/15.05 |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1* | 12/2010 | Zhang ............... C03B 5/2353 |
| | | 65/135.9 |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1* | 12/2011 | Huber ............... C03B 5/04 |
| | | 65/126 |
| 2012/0077135 A1 | 3/2012 | Charbonneau |
| 2012/0096963 A1* | 4/2012 | Hung ............... F16H 25/20 |
| | | 74/89.38 |
| 2012/0122490 A1 | 5/2012 | Khivesara et al. |
| 2012/0132725 A1 | 5/2012 | Dinu |
| 2012/0137737 A1* | 6/2012 | Sakamoto ............ C03B 3/026 |
| | | 65/66 |
| 2012/0308940 A1* | 12/2012 | Caso ............... F23G 7/08 |
| | | 431/3 |
| 2013/0086944 A1 | 4/2013 | Shock et al. |
| 2013/0086949 A1* | 4/2013 | Charbonneau ...... F23D 14/64 |
| | | 65/134.4 |
| 2013/0086950 A1 | 4/2013 | Huber et al. |
| 2013/0086951 A1* | 4/2013 | Charbonneau ...... C03B 5/202 |
| | | 65/134.9 |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |
| 2014/0041559 A1* | 2/2014 | Hirano ............... F23C 6/045 |
| | | 110/313 |
| 2016/0075586 A1* | 3/2016 | Charbonneau ........ C03B 5/1672 |
| | | 431/10 |
| 2016/0153654 A1* | 6/2016 | Richardson, III .... C03B 5/2356 |
| | | 431/160 |
| 2017/0044040 A1* | 2/2017 | Madeni ............... C03B 5/2356 |
| 2017/0326622 A1* | 11/2017 | Suzuki ............... F28D 11/02 |

FOREIGN PATENT DOCUMENTS

| | | |
|---|---|---|
| DE | 196 19 919 A1 | 8/1997 |
| DE | 100 29 983 C2 | 9/2003 |
| DE | 103 27 201 A1 | 1/2005 |
| DE | 10 2005 033330 B3 | 8/2006 |
| DE | 10 2008 006572 A1 | 7/2009 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 A | 5/1921 |
| IT | 1208172 | 7/1989 |
| JP | S58 199728 A | 11/1983 |
| JP | S61 9901 7 A | 5/1986 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |
| WO | WO-2014189501 A1 * | 11/2014 ........... C03B 5/1672 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass industry of the Future", United States Department of Energy, report 02-GA50113-03, pp. 1-17, Sep. 30, 2008.

Furman, Bj, Me 120 Experimental Methods Vibration Measurement, San Jose University Department of Mechanical and Aerospace Engineering.

Higley, Ba, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Obalin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

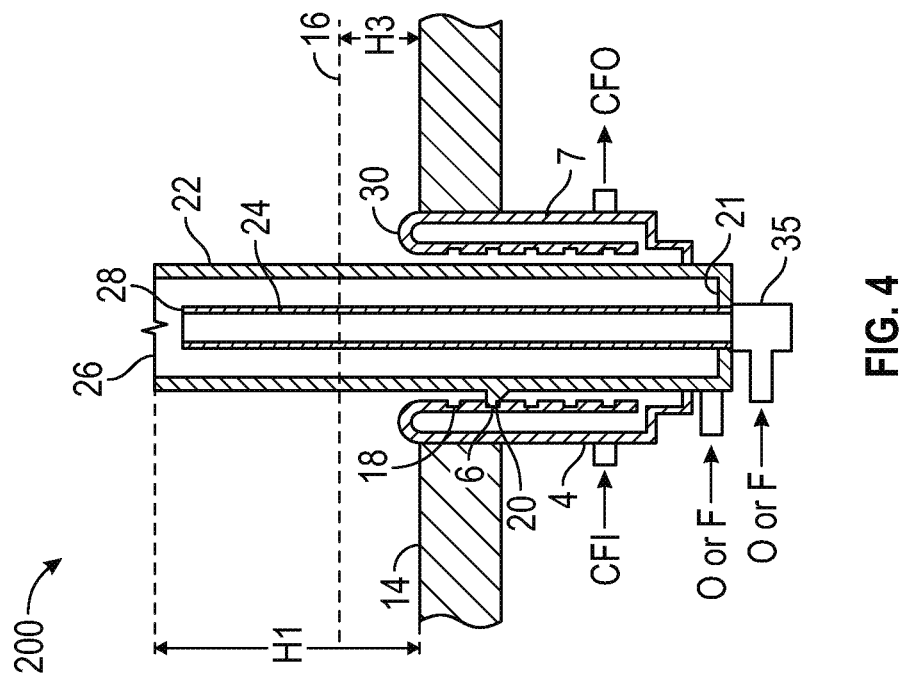
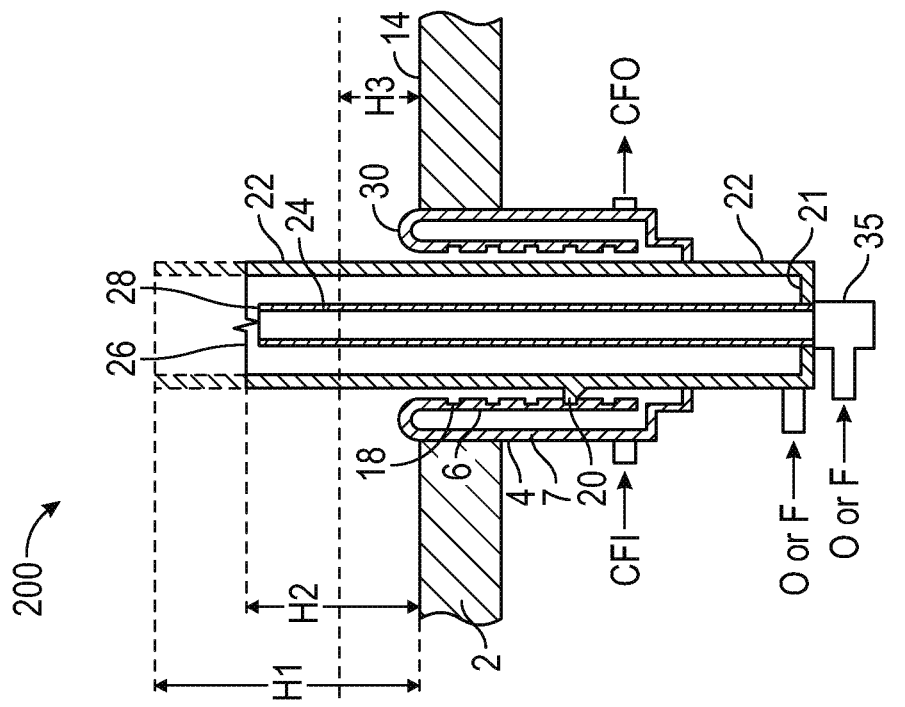

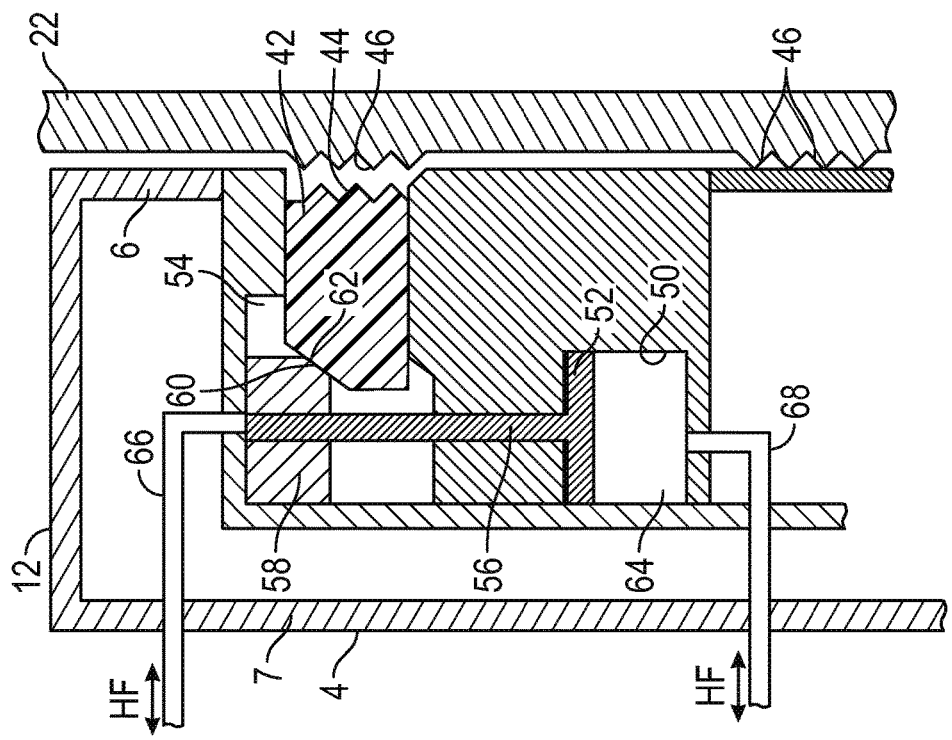
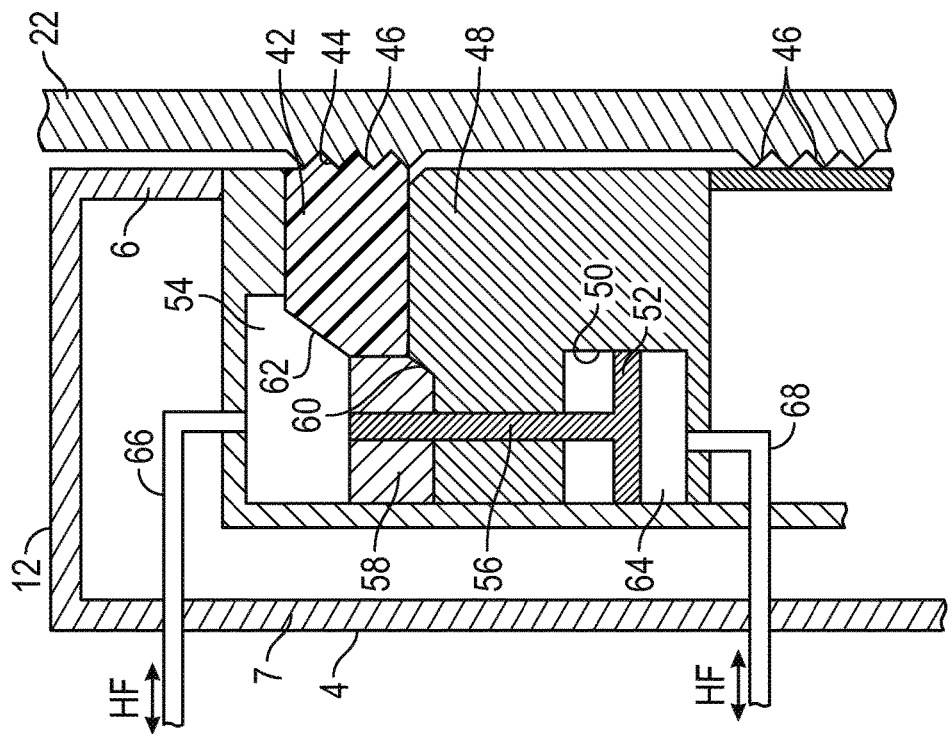

CONSUMABLE TIP BURNERS, SUBMERGED COMBUSTION MELTERS INCLUDING SAME, AND METHODS

BACKGROUND INFORMATION

Technical Field

The present disclosure relates generally to the field of combustion burners, combustion burner panels, and methods of use, and more specifically to burners, burner panels, submerged combustion melters, and methods of their use, particularly for melting glass-forming materials, mineral wool forming materials, rock wool forming materials, and other non-metallic inorganic materials.

Background Art

A submerged combustion melter (SCM) may be employed to melt glass batch and/or waste glass materials to produce molten glass, or may melt mineral wool feedstock to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming.

In the context of SCMs, SC burners are predominately water-cooled, nozzle mix designs and may avoid premixing of oxidant and fuel for safety reasons due to the increased reactivity of using oxygen or oxygen-enriched oxidants as the oxidant versus air. Nevertheless, certain submerged combustion burners employ a smooth exterior surface, half-toroid metallic burner tip of the same or similar material as the remainder of the burner, where the fuel and oxidant begin mixing just after escaping the burner tip. When using such burners in an SCM for the manufacture of glass or other molten materials, the burner tip is placed in an extreme environment. The burner tip may be exposed to corrosive oxidants, fuels, and/or combustion products, high temperature direct contact with molten and/or unmelted materials (unmelted materials may be very abrasive to metal burner components and refractory linings of an SCM), internal pressure from water or other coolant, vaporization of coolant within the burner tip, thermal cycling, and the like. As a result, great engineering and design effort has been expended designing half-toroid metallic burner tips of the same or similar material as the remainder of the burner having thermal fatigue resistance, high melting point, high temperature corrosion/oxidation resistance, high temperature structural strength, and with ease of ability to join to the remainder of the burner.

Due to these requirements, noble metal (sometimes referred to as precious metal) alloys have become the focus for half-toroid metallic burner tips and other burner components. However, being expensive alloys, it is not presently economical to fabricate the entire burner using these materials. Because of this, up until now the burner designer was left with the challenge of determining how to best attach the non-noble metal portion of the burner to the noble metal tip without sacrificing other concerns, such as good mechanical strength, coolant leak proofing, and noble metal recovery. It would be an advanced in the submerged combustion melter art to avoid some or all of these issues, and prolong the run-length or campaign length of submerged combustion melters.

SUMMARY

In accordance with the present disclosure, submerged combustion (SC) burners and burner panels are described that may reduce or eliminate problems with known SC burners, melters, and methods of using the melters to produce molten glass and other non-metallic inorganic materials, such as rock wool and mineral wool.

One aspect of this disclosure is a combustion burner comprising:
(a) an annular liquid cooled jacket defining a central longitudinal through passage;
(b) at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; and
(c) the outer conduit having an exterior surface configured along at least a portion thereof with threads mating with adjacent threads on an inner surface of the annular liquid cooled jacket.

Other burner embodiments are included in this disclosure, such as those where rather than mating threads, at least two sets of axially spaced dog teeth are provided, one set mating with adjacent dog teeth on one or more dog connectors secured in the annular liquid cooled jacket, as described herein. Other burner embodiments may replace the mating threads with one or more locking bolts, also as described herein. Burner panels including at least one burner of this disclosure, submerged combustion melters (SCM) comprising at least one burner panel of this disclosure, and methods of producing molten non-metallic inorganic materials such as molten glass, in the SCMs, are considered additional aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

In all burner embodiments, as the burner tip wears the operator may utilize the features of the burner to advance the burner so that its distal end is again at its original location beyond the SCM floor, sidewall, or roof, as the case may be. This allows the SCM designer the option of using less wear-resistant burner materials than expensive noble metals. The burners also allow the burner tips to be positioned initially further away form the SCM floor, sidewall, or roof, which should encourage longer refractory life. The burners, burner panels, SCMs, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 1-6 are schematic cross-sectional views, partially in phantom, of three burner panels in accordance with the present disclosure;

FIGS. 7 and 8 are schematic cross-sectional views of an annular liquid-cooled jacket including dog connectors in accordance with one embodiment of the present disclosure;

Figure 1:
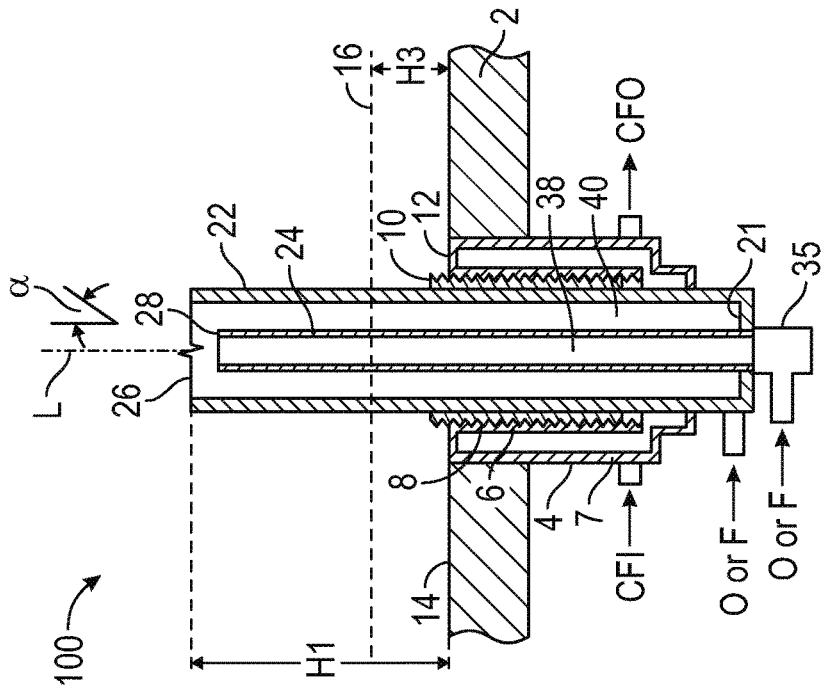

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed burners, burner panels, SCMs, and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the composition of the inner or outer burner conduits: a conduit consisting essentially of carbon steel means there may be a minor portions or trace amounts of metals, oxides, and other chemical species that are noble metals, such chromium, platinum, and the like, and a conduit consisting essentially of noble metal may have trace amounts of iron, iron oxides, carbon, and other metal oxides. An example of "consisting of" may be a burner made up of components that are one or more carbons steels and no noble metals or ceramic materials, or only conduits made up of noble metals. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. An example of methods and systems using the transition phrase "consisting of" includes those where only burners having liquid-cooled jackets are used, with no gas-cooled jackets, or vice versa. The term "comprising" and derivatives thereof is not intended to exclude the presence of any additional component, step or procedure, whether or not the same is disclosed herein. In order to avoid any doubt, all compositions, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date hereof. The acronym "ASTM" means ASTM International, 100 Barr Harbor Drive, PO Box C700, West Conshohocken, Pa., 19428-2959 USA.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+k*(RU-RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

All U.S. patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, great engineering and design effort has been expended designing half-toroid metallic burner tips of the same or similar material as the remainder of the burner having thermal fatigue resistance, high melting point, high temperature corrosion/oxidation resistance, high temperature structural strength, and with ease of ability to join to the remainder of the burner. Due to these requirements, noble metal alloys have become the focus for half-toroid metallic burner tips and other burner components. However, being expensive alloys, it is not presently economical to fabricate the entire burner using these materials. Because of this, up until now the burner designer was left with the challenge of determining how to best attach the non-noble metal portion of the burner to the noble metal tip without sacrificing other concerns, such as good mechanical strength, coolant leak proofing, and noble metal recovery. It would be an advanced in the submerged combustion melter art to avoid some or all of these issues, and prolong the run-length or campaign length of submerged combustion melters. The presently disclosed burners, burner panels, SCMs, and methods are devoted to resolving one or more of these problems.

Various terms are used throughout this disclosure. "Submerged" as used herein means that combustion gases emanate from combustion burners or combustion burner panels under the level of the molten glass; the burners or burner panels may be floor-mounted, wall-mounted, roof-mounted, or in melter embodiments comprising more than one submerged combustion burner, any combination thereof (for example, two floor mounted burner panels and one wall mounted burner panel). Burner panels described herein may form part of an SCM floor, sidewall, or roof structure. In certain embodiments one or more burner panels described herein may form the entire floor. A "burner panel" is simply a panel equipped to emit fuel and oxidant. "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "melter exhaust", and "melter flue gas" are equivalent terms and refer to a combination of combustion gases and effluent from the feedstock being melted, such as adsorbed water, water of hydration, $CO_2$ liberated from $CaCO_3$, and the like. Therefore exhaust may comprise oxygen or other oxidants, nitrogen, combustion products (including but not limited to, carbon dioxide, carbon monoxide, $NO_x$, $SO_x$, $H_2S$, and water), uncombusted fuel, reaction products of melt-forming ingredients (for example, but not limited to, basalt, sand (primarily $SiO_2$), clay, limestone (primarily $CaCO_3$), burnt dolomitic lime, borax and boric acid, and the like.

As used herein, unless indicated to the contrary, "feedstock" includes, but is not limited to: glass batch; cullet; and pieces of porous, semi-porous, or solid rock or other non-metallic inorganic material, or organic material, or mixture of organic and inorganic material. "Particulate feedstock" as used herein means any feedstock having a weight average particle size (APS) that is small, where small is less than 1 mm APS. Other size feedstock(s) may simultaneously be fed to the SCMs of this disclosure, for example feedstocks having particle size ranging from about 1 mm to about 10 cm, or from about 1 cm to about 10 cm, or from about 2 to about 5 cm, or from about 1 to about 2 cm. The only upper limit on feedstock weight average particle size for these larger APS feedstocks is the internal diameter of feedstock supply structure components, such as described in Applicant's U.S. published patent application 2014/0007622, (U.S. application Ser. No. 13/540,704 filed Jul. 3, 2012), now U.S. Pat. No. 9,643,869, issued May 9, 2017, while the lower size limit is determined by angle of flow, flow rate of feedstock, and in those embodiments where heat is exchanged directly or indirectly from melter exhaust to the feedstock, flow rate of melter exhaust.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof. The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

"Conduits" need not have a circular cross-section. SCMs need not have a rectangular cross-section or floor plan. The term "hydraulic diameter" means $D_H=4A/P$, where A is the cross-sectional area, and P is the wetted perimeter of the cross-section. Hydraulic diameter is mainly used for calculations involving turbulent flow, and for calculating Reynolds number, $Re=\rho uL/\mu$, where $L=D_H$,
$\mu$=viscosity,
$\rho$=density, and
u=velocity.

Secondary flows (for example, eddies) can be observed in non-circular conduits and vessels as a result of turbulent shear stress in the fluid flowing through the conduit or vessel experiencing turbulent flow. Hydraulic diameter is also used in calculation of heat transfer in internal flow problems. For a circular cross-section conduit, $D_H$ equals the diameter of the circle. For a square conduit having a side length of a, the $D_H$ equals a. For a fully filled conduit whose cross section is a regular polygon, the hydraulic diameter is equivalent to the diameter of a circle inscribed within the wetted perimeter. "Turbulent conditions" means having a Re>4000, or greater than 5000, or greater than 10,000, or greater than 20,000 or higher. The phrase "turbulent conditions in substantially all of the material being melted" means that the SC burners and the SCM are configured so that there may be some regions near the wall and floor of the SCM where the material being melted will be in transient or laminar flow as measured by Re, but the majority (perhaps greater than 51%, or greater than 55%, or greater than 6%, or greater than 65%, or greater than 70%, or greater than 75%, or greater than 80% of the material being melted will be experiencing turbulent flow. Transient flow is defined as 2300<Re<4000, and laminar flow is defined as Re<2300. The phrase "ejected portions of melted material" means portions of the material being melted (or completely molten material) that actually separate from the splash zone and travel generally upward toward the SCM ceiling, or toward the SCM walls above the splash zone, and even up into the exhaust structure, then either solidify or drip back down into the melt, or fall back into the melt after an arcuate path upward, reaching a maximum, then falling back into the melt, as in projectile motion.

Burners and burner panels of the present disclosure aim to solve the problem of short life of SC burners and/or refractory linings of the SCM. In certain embodiments this may be accomplished by use of burners and burner panels including one or more inner conduits and an outer conduit, the outer conduit having a fluid-cooled annular jacket, with portions of the inner and outer conduits extending their distal ends beyond the wall of the SCM ("wall" includes floor, sidewall, and roof). Extending the distal ends beyond the wall of the SCM at the initiation of a melting campaign allows the burner conduits to be made of less costly metals such as carbon or stainless steels, rather than noble metals, although noble metals can be employed if desired. As the distal ends (sometimes referred to in the art as "burner tips") wear away due to interaction with the molten material and unmelted portions of feed (which maybe very erosive of the burner materials), one or more of the conduits may be advanced, that is to say, moved axially toward the interior of the SCM, so that the burner conduit distal ends are again near their original positions.

Certain embodiments comprise:
(a) an annular liquid cooled jacket defining a central longitudinal through passage;

(b) at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; and (c) the outer conduit having an exterior surface configured along at least a portion thereof with threads mating with adjacent threads on an inner surface of the annular liquid cooled jacket.

In certain embodiments the distal end of the outer conduit may extend beyond the distal end of the at least one inner conduit, with both inner and outer conduits extending beyond a distal end of the annular liquid cooled jacket. In certain embodiments the distal end of the at least one inner conduit may extend beyond the distal end of the outer conduit, with both extending beyond a distal end of the annular liquid cooled jacket. In certain embodiments the distal ends of the at least one inner conduit and the outer conduit may extend an equal distance beyond a distal end of the annular liquid cooled jacket.

In certain embodiments each conduit may consist of a material having a wear rate that is less than noble metals when used in a submerged combustion melter to melt glass-forming, mineral wool-forming, rock-wool-forming, or other inorganic feed materials. In certain embodiments the materials may be selected from the group consisting of ceramic materials, non-noble metals, and combinations thereof. In certain embodiments the non-noble metal may be carbon steel. In certain embodiments the outer conduit may be noble metal and the one or more inner conduits may be a non-noble metal material, with wear rate of the outer noble metal conduit tailored to be 1, 5, or 10% or less of wear rate of non-noble metal material ("non-noble metal material" includes both non-noble metals and ceramic materials). Without being limited to any particular theory, it is theorized that the outer conduits will wear more rapidly than inner conduits made of the same material, since the outer conduit portion extending beyond the wall and cooling jacket is exposed to the molten or semi-molten material in the SCM, and will be cooled only on one side by flowing fuel or oxidant, whereas the inner conduit(s) will be cooled on their interior and exterior by flowing fuel or oxidant.

In certain embodiments the conduits are configured so that the outer and inner conduits are movable axially in unison. In certain embodiments the conduits are configured so that the outer and inner conduits are movable axially separately.

Figure 2:
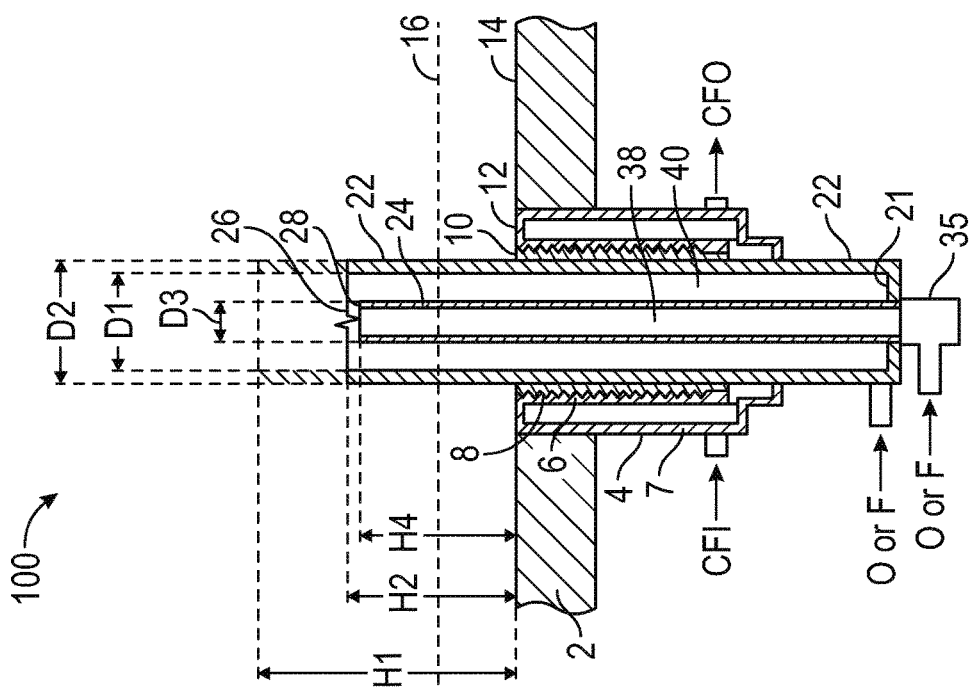
Figure 5:
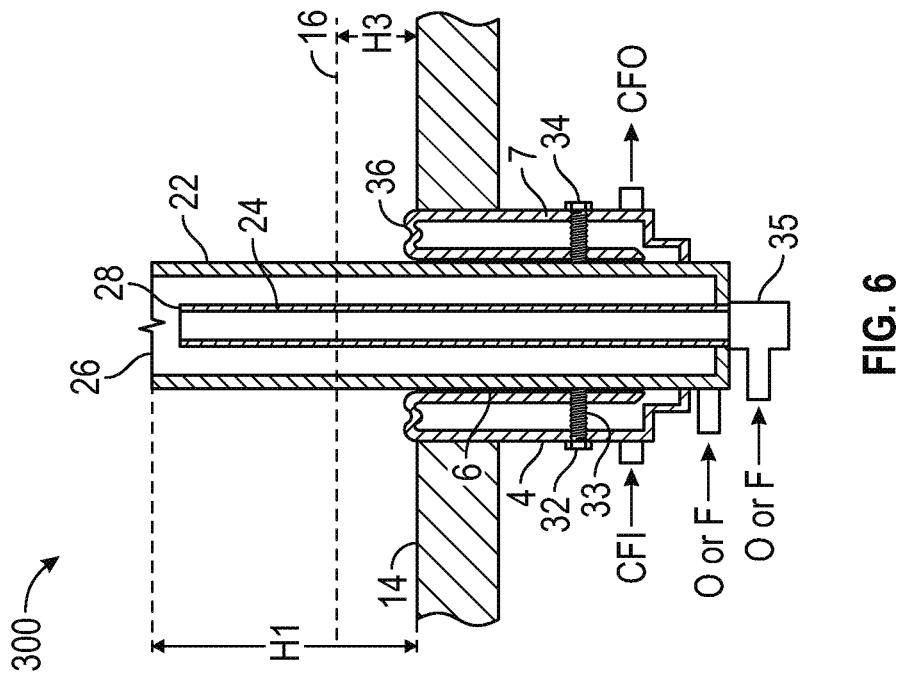
Figure 6:
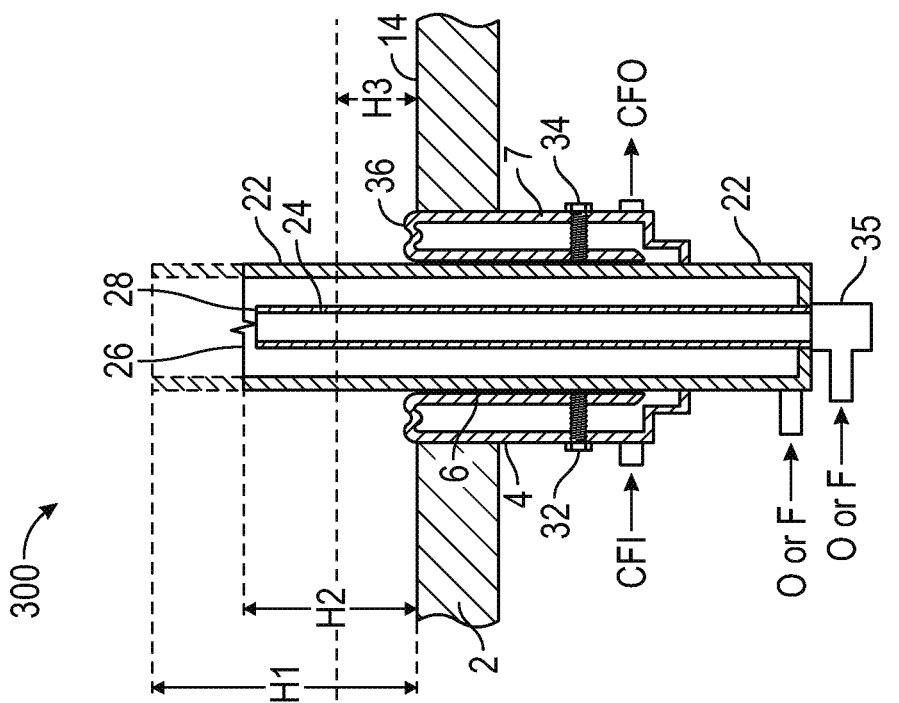

In certain burner embodiments, rather than mating threads, at least two sets of axially spaced dog teeth are provided, one set mating with adjacent dog teeth on one or more dog connectors secured in the annular liquid cooled jacket, as described herein. Other burner embodiments may replace the mating threads with one or more locking bolts passing through the annular liquid cooled jacket radially, the locking bolt having a distal end engageable with an external surface of the outer conduit FIGS. 1-6 are schematic cross-sectional views, partially in phantom, of three burner panels in accordance with the present disclosure. FIGS. 1, 3, and 5 illustrate the status of the burner after experiencing wear, with the initial position of the burner tip illustrated in phantom. FIGS. 2, 4, and 6 illustrate the status of each embodiment after advancing the burner conduits axially toward the interior of the SCM. Embodiments 100, 200, and 300 each includes a panel body 2 comprised of a non-fluid-cooled or fluid-cooled material, in certain embodiments a metal shell (preferably steel or other high-strength material) with a refractory lining, having a top surface 14. Such refractory lining materials may include ceramics such as, but not limited to, alumina and silicon nitride, refractory materials such as, but not limited to, chrome-containing or zircon-based refractory metals, and noble metals, or mixtures or combinations thereof.

Still referring to FIGS. 1-6, another optional layer or layers 16 may be present as post-formed or pre-formed skulls of the glass or other material being melted in the SCM, as discussed herein, and therefore are depicted schematically in phantom. Glass skull may also be present on the exterior of the burner conduits but is omitted in the figures for clarity. The skull may have a height H4 (FIG. 2).

Referring again to FIG. 1, burner panel 100 includes an outer conduit 22, an inner conduit 24 (which may be more than one conduit) that are substantially concentric. As used herein, "substantially concentric" means that conduits 22, 24 may be concentric, or conduit 24 may be non-concentric with a longitudinal axis "L" of conduit 22 (see FIG. 2), especially if conduit 24 is comprised of more than one conduit. If conduit 24 is more than one conduit (for example 2 to 10, or 2 to 8, or 2 to 6, or 3 to 6 conduits), the conduits 24 may be centered about the longitudinal axis L of conduit 22. Conduit(s) 24 define a primary passage 38 for fuel ("F") or oxidant ("O"), while the space between outer conduit 22 and inner conduit(s) 24 defines a secondary passage 40 for fuel or oxidant. For example, during operation fuel may flow through primary passage 38 (and thus conduit(s) 24 may be referred to as "fuel conduit(s)") while oxidant may flow through secondary passage 40 (and thus conduit 22 may be referred to as an "oxidant conduit"). In other embodiments, conduit 22 may be the fuel conduit while conduit(s) 24 may be the oxidant conduit.

Still referring to embodiment 100 and FIG. 1, outer conduit 22 maybe connected to a source of F or O at its proximate end plate 21, and a connector 35 for connecting inner conduit 24 to a source of F or O. Connector 35 may also be welded or otherwise secured to proximate end plate 21 of conduit 22, for example with a threaded fitting. At a distal end 26 of outer conduit 22 is illustrated a jagged wear surface at a height H2, worn down from its original height H1, while distal end 28 is illustrated recessed at height H4. During the course of an SCM melting campaign, the distal ends may wear evenly or at different rates depending on their composition, causing all three conditions to be possible: H2>H4; H2<H4; and H2=H4. Further at the beginning of the melting campaign, all three conditions may be possible.

Referring specifically to embodiment 100 of FIGS. 1 and 2, coolant fluid inlet ("CFI") and coolant fluid outlet ("CFO") connections are illustrated for a fluid-cooled, preferably liquid-cooled annular cooling jacket 4. Annular cooling jacket 4 includes an inner wall 6 having a threaded exterior surface 8 that mates with threads 10 on an external surface of outer conduit 22. Annular cooling jacket 4 also includes and outer wall 7, and a top 12 closing the distal ends of walls 7 and 6. In embodiment 100, top 12 is a flat annular disk, but as explained herein this need not be true in other embodiments, and may have shapes such as disclosed in Applicant's co-pending U.S. patent application Ser. No. 14/785,327 filed Oct. 17, 2015. Walls 6, 7 and top 12 may all be carbon steel or noble metal, in which case they may be formed from a single ingot, or welded together from separate components, or top 12 may be noble metal and walls 6,7 carbon steel. In such embodiments the noble metal top may be joined to the carbon steel walls by a method such as described in Applicant's co-pending U.S. patent application Ser. No. 14/785,325 filed Oct. 17, 2015. Annular cooling jacket 4 may also include a water insert or other baffle device as illustrated in the '325 application.

Still referring to embodiment 100 illustrated schematically in FIGS. 1 and 2, conduit diameters D1, D2, and D3 are identified, as well as a burner angle "α" (FIG. 2) that may range from 0 to about 60 degrees, or from about 5 to about 45 degrees. Ranges for magnitude of D1, D2, D3, H1, H2, H3, H4, and burner angle α are provided in Table 1. It will be understood that these are approximate ranges (each number includes the word "about" before it), are not exclusive ranges, and that any range within the tabulated ranges are explicitly disclosed herein.

TABLE 1

Burner Dimensions

| Dimension | Range (in. or deg.) | Pref. Range. (in. or deg.) | Range (cm or deg.) | Pref. range (cm or deg.) |
| --- | --- | --- | --- | --- |
| D1 | 2.0-8.0 | 4.0-6.0 | 5-20 | 10-15 |
| D2 | 2.25-9.0 | 4.25-6.25 | 5.7-23 | 10.8-15.9 |
| D3 | 0.25-6.0 | 0.5-4.0 | 0.6-15 | 1-10 |
| H1 | 5-20 | 8-12 | 13-51 | 20-30 |
| H2 | 2-12 | 4-6 | 5-30 | 10-15 |
| H3 | 0-6 | 2-4 | 0-15 | 5-10 |
| H4 | 1.5-14 | 2-10 | 3.8-36 | 5-25 |
| α | 0-60 | 5-45 | 0-60 | 5-45 |

Referring now to FIGS. 3 and 4, embodiment 200 includes many of the features of embodiment 100 of FIGS. 1 and 2, but with the following changes. Rather than threads allowing advancement of outer conduit 22, embodiment 200 includes at least two axially spaced notches 18 in the out surface of inner wall 6 of annular cooling jacket 4. Spring-loaded dogs 20 on the exterior surface of outer conduit 22 cause dogs 20 to move outwardly (radially) into notches 18. Dogs 20 may be retracted when it is desired to advance the outer and inner conduits. FIG. 3 illustrates dogs 20 in their locked and original position in a first set of notches 18, such as at the beginning of a melting campaign, and FIG. 4 illustrates dogs 20 in an advanced position locked into another set of notches 18. Dogs 20 may be retracted by, for example, an operator inserting a tool or rod (not illustrated) into a lower end plate of annular cooling jacket 4. In other embodiments, conduit 22 may rotated, causing dogs 20 to be moved against a non-notched region adjacent a notch 18 and causing the dogs to be retracted. Another difference between embodiments 100 and 200 is that the top 12 of annular cooling jacket 4 is a half-toroid, 30.

Referring now to FIGS. 5 and 6, embodiment 300 includes many of the features of embodiment 100 of FIGS. 1 and 2, but with the following changes. Rather than threads allowing advancement of outer conduit 22, embodiment 200 includes at least one, or at least two, or at least 3 or more circumferentially spaced locking bolts 32, 34 extending through the outer wall 7 and inner wall 6 of annular cooling jacket 4. Locking bolts 32, 34 each have a distal end engageable with an external surface of the outer conduit 22. Alternatively, locking bolts 32, 34, could extend into or even through the wall of outer conduit 22, even as far as to or through inner conduit 24, and even in some embodiments through one sidewall of conduit 22 and extend to, into, or through the opposite sidewall of outer conduit 22. These features could add strength to the burner. In certain embodiments, one or more locking bolts may have a sleeve 33 through which the locking bolt 32 extends, such as illustrated schematically in FIG. 6. Sleeve 33 may serve to protect locking bolt 32 from corroding. A further difference is in the provision of a shaped top 36 for the cooling jacket 4, such as one of the shapes described in Applicant's co-pending U.S. patent application Ser. No. 14/785,327 filed Oct. 17, 2015.

Referring now to FIGS. 7 and 8, a more detailed example of locking dogs is illustrated, in this embodiment hydraulically lock and release locking dogs. FIG. 7 illustrates a locked status, while FIG. 8 illustrates a released status. Locking dog 42 has several teeth 44 that mate with corresponding teeth 46 formed in or on the exterior surface of outer conduit 22. At least one other set of teeth 46 in the lower portion of FIGS. 7 an 8 are provided. Dog 42 is supported slidingly on a block 48 inside of annular cooling jacket 4. Block 48 includes a cylinder 50 accommodating a piston 52. Cylinder 50 defines a lower chamber 64. An upper chamber 54 above block 48 and dog 42 is also provided. Upper and lower chambers 54, 64 may alternately be filled with and drained of hydraulic fluid ("HF") through tubes 66 and 68 connected to a supply of hydraulic fluid and respective hydraulic pumps (not illustrated). Piston 52 is connected with a piston base 58 by a piston rod 56 that is held by and able to slide in block 48. Importantly, block 48 includes a chamfered edge 60, as does dog 42 at chamfered edge 62. When it is desired to advance outer burner conduit 22, hydraulic fluid is pumped through tube 68 into lower chamber 64, causing piston 52 to rise, and when chamfered edges 60 and 62 mate, dog 42 may slide out radially (leftward in FIG. 8) to the release position. Outer conduit 22 may then be advanced so that the lower set of teeth 46 align with the dog teeth 44, and hydraulic fluid is then pumped through tube 66 to fill upper chamber 54, locking dog 42 back in place. In instances where the dog may be stuck, for example by frozen glass or other material being processed in the SCM, it may be possible to cycle the HF in and out, "jarring" locking dog 42 until it breaks free.

There are innumerable options, variations within options, and sub-variations of options for the SCM operator to select from when operating an SCM and profiling the SC burners. After all, the SCM is essentially a continuous or semi-batch chemical reactor with simultaneous heat and mass transfer. For example, to name just a few, an operator may choose (option 1) to operate all SC burners equally, that is, using the same fuel and oxidant, and of the total combustion flow rate (TCFR) from the SC burners, each SC burner is operated to produce the same fraction of the TCFR. Another option (option 2) would be to operate as option 1, but with different oxidant in one or more burners. Option 3 may be to operate with same oxidant in all burners, but with different fuel in one or more SC burners. As one can readily see, the number of options is quite large, and selecting the operation of the SC burners in such a chemical reactor with simultaneous heat and mass transfer can be an overwhelming task. Even if the "same" fuel and "same" oxidant are used for each SC burner (an ideal assumption that is never true in practice, since fuel and oxidant compositions change with time), the variations are endless, and can be an overwhelming task to sort through. The task of operating an SCM is even more daunting when particulate feed materials are fed to the SCM from above the turbulent, violent melt.

Figure 9:
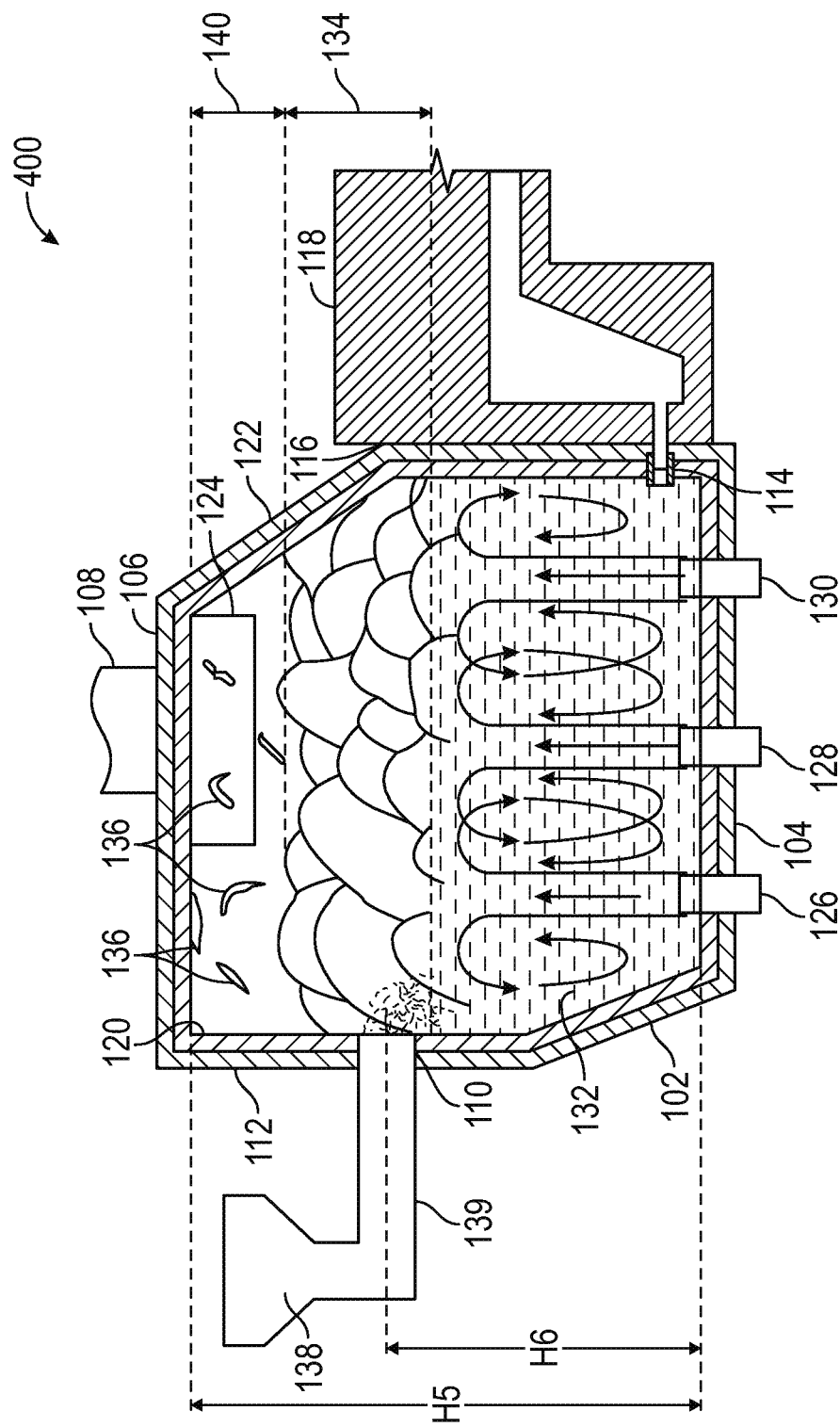
FIG. 9 is a schematic cross-sectional view.
Figure 10:
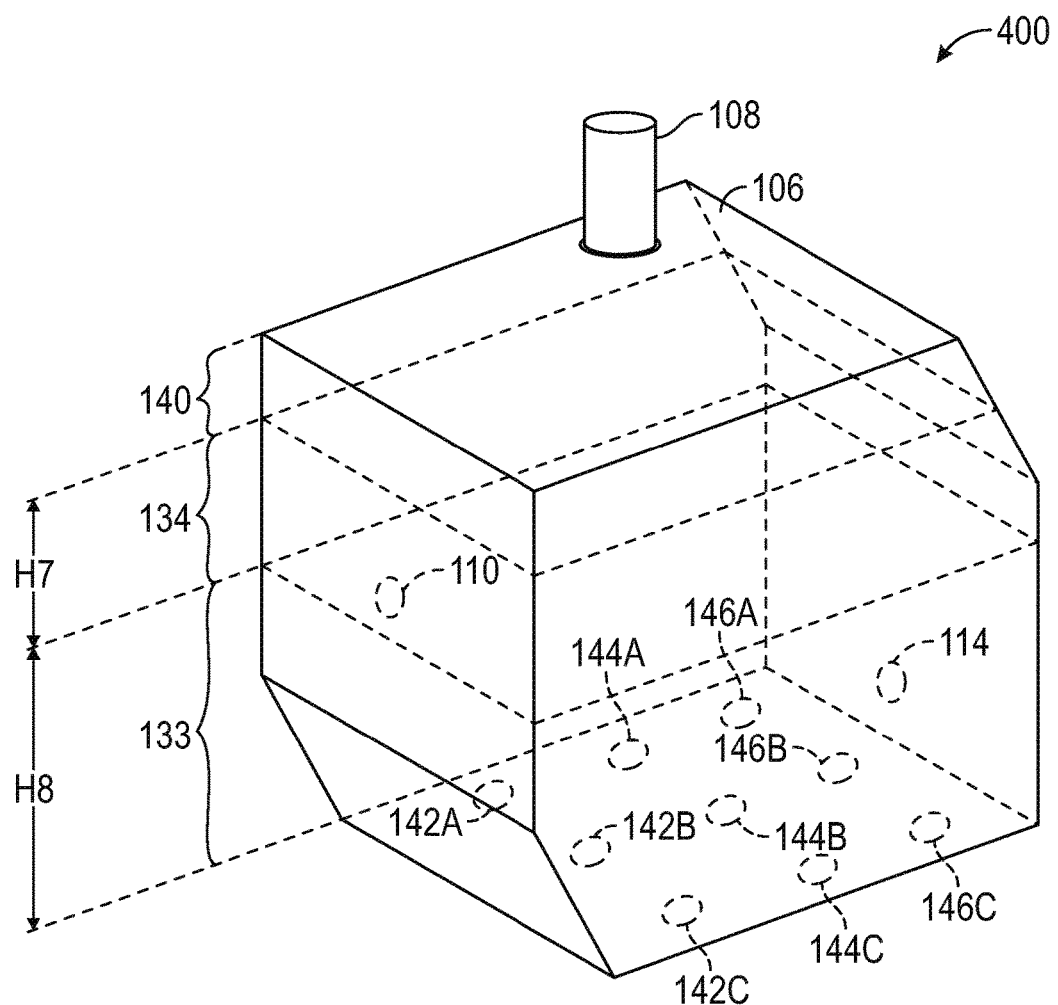
FIG. 10 is a schematic perspective view, partially in phantom, of an SCM in accordance with the present disclosure.

FIG. 9 is a schematic cross-sectional view, and FIG. 10 is a schematic perspective view, partially in phantom, of one embodiment 400 of an SCM in accordance with the present disclosure employing at least one burner of the present disclosure. Embodiment 400 includes nine SC burners are arranged in a 3×3 matrix of rows and columns, as illustrated schematically in the schematic perspective view of FIG. 10. The SCM includes a sidewall structure 102, floor 104, roof or ceiling 106, exhaust stack 108, and a particulate feedstock inlet 110 in a splash region 134. Particulate feedstock inlet 110 (there may be more than one) is fed by a particulate feeder 138, which may include an auger or screw feeder (not illustrated), as well as a device to maintain the inlet 110 open, such as a pipe-in-pipe knife arranged inside feeder tube 139 operated by an actuator with a timer for example (the knife, actuator, and timer are not illustrated for clarity). For purposes of description, the SCM has a feed end (or first end) 112 and a melt exit end (or second end) 116, the latter having a melt exit 114. While not important to the various SCM and method embodiments described herein, SCM 400 is typically fluidly connected to (but not necessarily structurally connected to) a melter exit structure 118. SCM 400 further includes a refractory lining 120 and a superstructure 122 each of which may comprise one or more fluid-cooled panels ("fluid-cooled" is a defined term herein). Also illustrated is an exhaust plenum 124, one or more exhaust gas outlets that can be from the side or top of the SCM. Also illustrated schematically in FIG. 9 are positions of SC burners 126, 128, and 130, which are the centerline SC burners, turbulent melt 132 in a turbulent melt region 133 (with curved arrows indicating approximate flow pattern for the turbulent melt), and splash region 134. The SCM also has a head space region 140 above splash region 134 where gobs or splashes of molten material 136 break free and may be in free flight, and may collide with each other or with the refractory inside the SCM, or they may simply fall back into the splash region 134 and fall further into the molten melt 132. FIG. 10 also illustrates the positions of passages 142A, 142B, 142C, 143A, 143B, 143C, 144A, 144B, and 144C through SCM floor 104 for SC burners.

Referring again to FIGS. 9 and 10, Heights H5, H6, H7, and H8 may be defined, where H6 is defined as the height of the particulate feedstock inlet port measured from SCM floor 104; H5 is defined as the height of the SCM ceiling 106 as measured from the SCM floor 104; H7 is defined as the maximum height of the splash region 134 (or the minimum height of the head space region 140); and H8 is defined as the minimum height of the splash region 134 (or the maximum height of the turbulent melt region 133). The ratio of H6/H5 is an important parameter, and may range from about 0.33 to about 0.67. All ranges, sub-ranges, and point values from about 0.33 to about 0.67 are explicitly disclosed herein. The lower limit of the ratio H6/H5 may be 0.335, 0.34, 0.345, 0.35, 0.355, 0.36, 0.365, 0.37, 0.375, 0.38, 0.385, 0.39, 0.395, 0.4, 0.405, 0.41, 0.415, 0.42, 0.425, 0.43, 0.435, 0.44, 0.445, 0.45, 0.455, 0.46, 0.465, 0.47, 0.475, 0.48, 0.485, 0.49, 0.495, or 0.5; the upper limit of H6/H5 may be 0.5, 0.505, 0.51, 0.515, 0.52, 0.525, 0.53, 0.535, 0.54, 0.545, 0.55, 0.555, 0.56, 0.565, 0.57, 0.575, 0.58, 0.585, 0.59, 0.595, 0.6, 0.605, 0.61, 0.615, 0.62, 0.625, 0.63, 0.635, 0.64, 0.645, 0.65, 0.655, 0.66, or 0.665. For example, H6/H5 may range from about 0.4 to about 0.6; or from about 0.45 to about 0.67, or from 0.40 to 0.60, or from 0.45 to 0.67. The relative term "about" when used to describe H6/H5 means within 0.001, or within 0.01, or within 0.1. The values of H7 and H8 during operation of SCMs of the present disclosure may be the same or different along the centerline (C) of the SCM, and along the width (VV) of the SCM. It is preferred that the relationship H7 >H6 >H8 holds in all locations inside SCMs of this disclosure, but especially in the vicinity of the particulate feedstock inlet port or ports 110.

Figure 11:
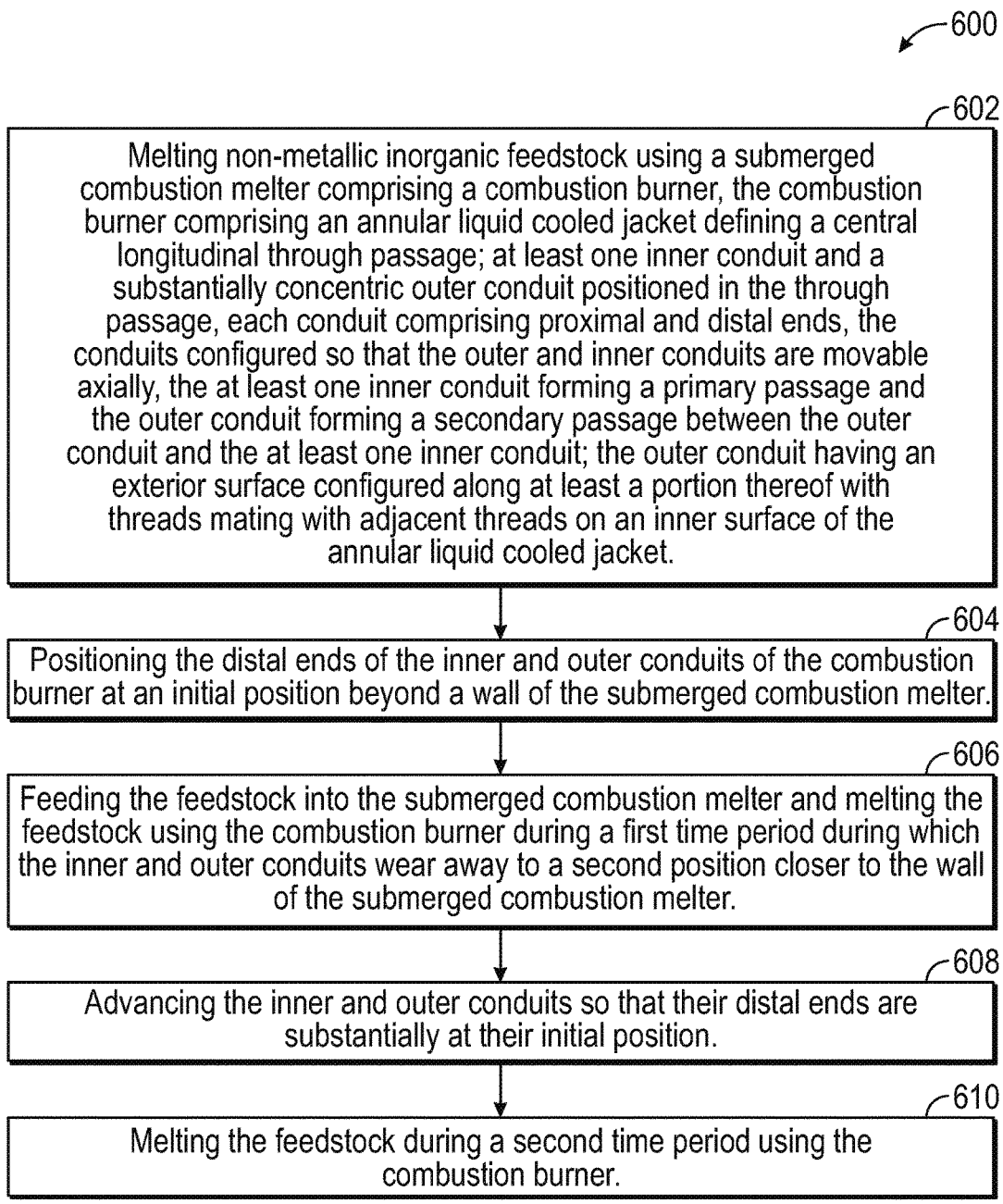
FIGS. 11-13 are schematic logic diagrams of three methods of melting non-metallic inorganic materials in accordance with the present disclosure.
Figure 12:
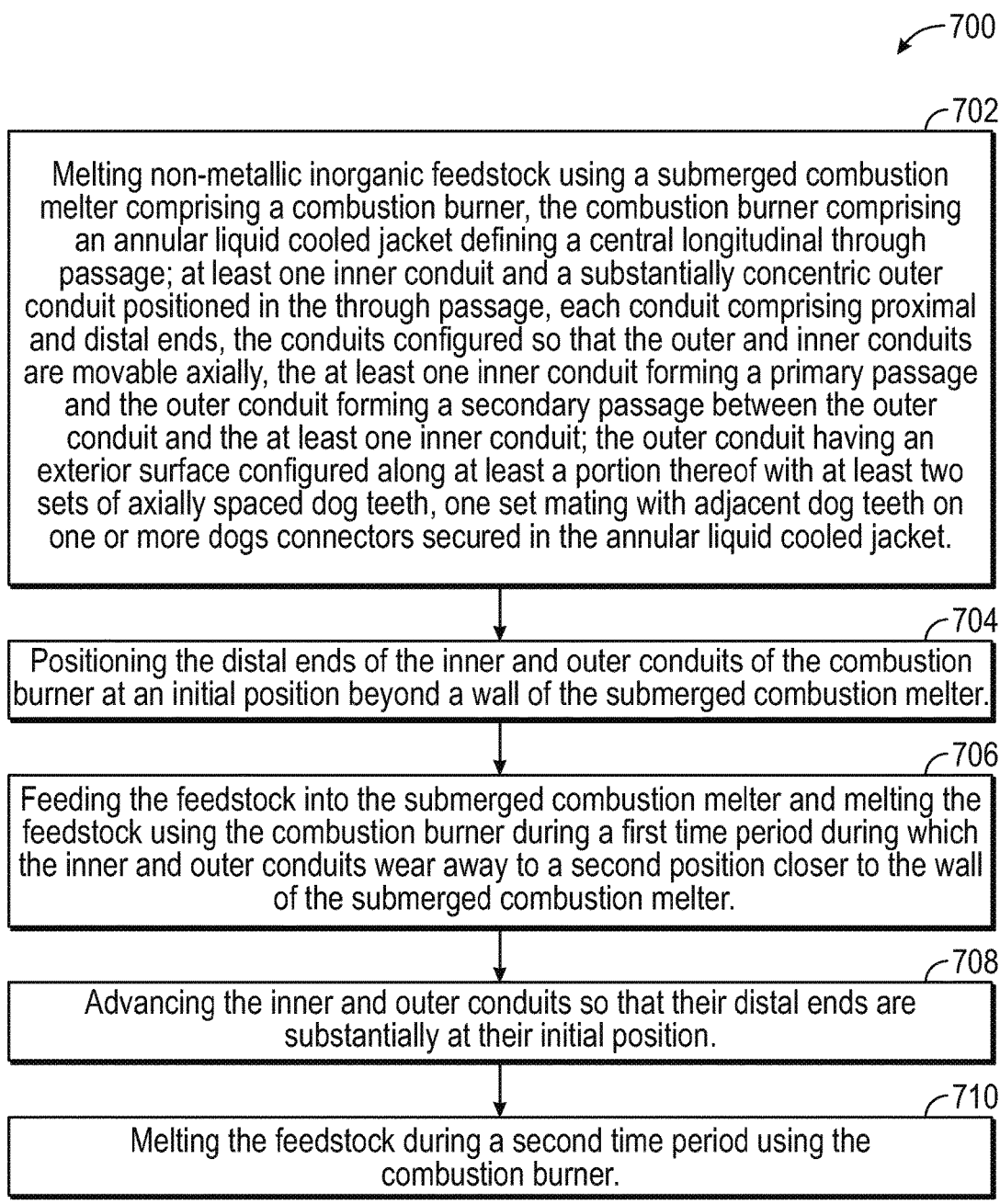
Figure 13:
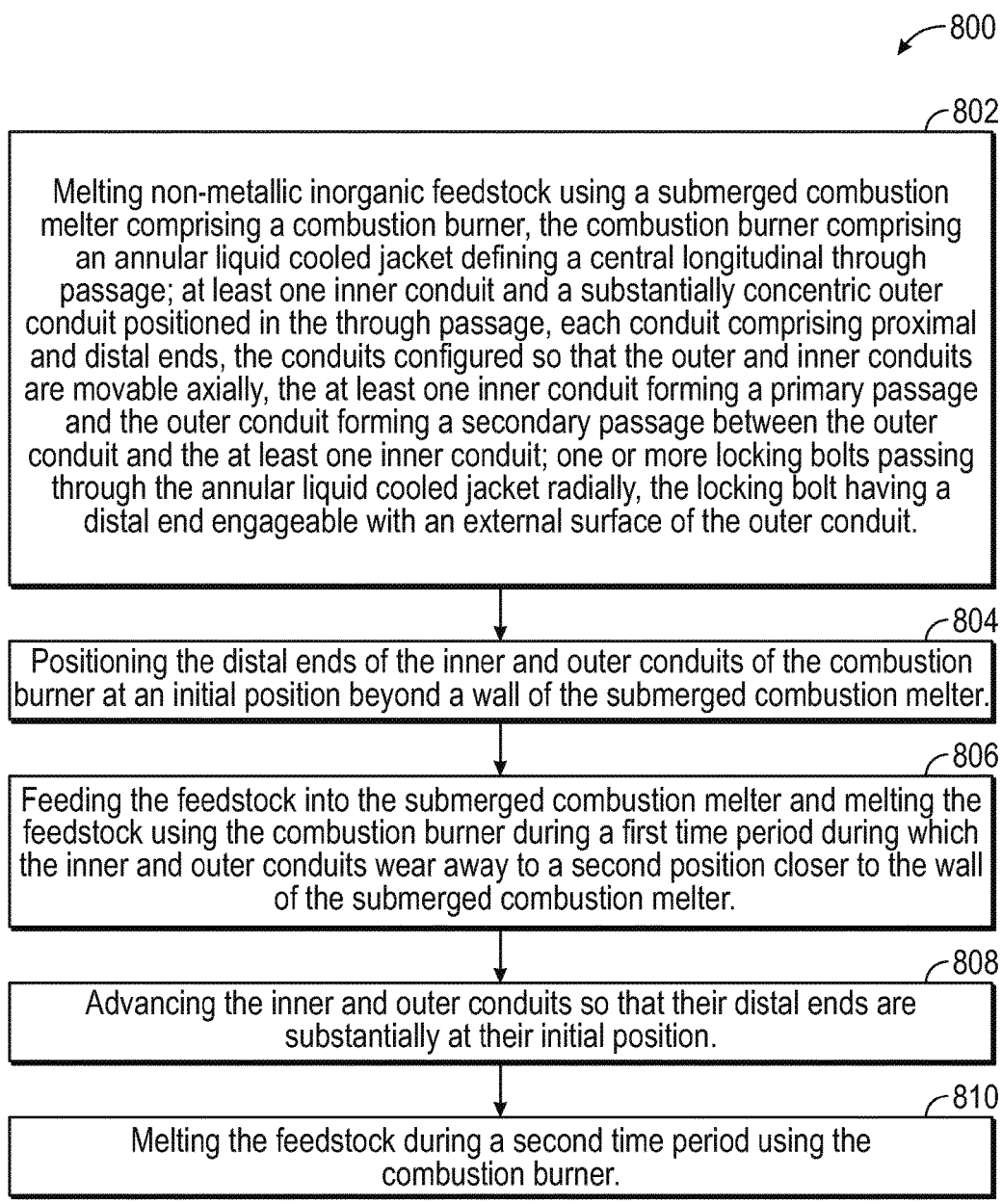

FIGS. 11, 12, and 13 are logic diagrams illustrating three method embodiments 500, 600, and 700 of the present disclosure. Method embodiment 500 comprises (Box 502) melting non-metallic inorganic feedstock using a submerged combustion melter comprising a combustion burner, the combustion burner comprising an annular liquid cooled jacket defining a central longitudinal through passage; at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; the outer conduit having an exterior surface configured along at least a portion thereof with threads mating with adjacent threads on an inner surface of the annular liquid cooled jacket. Method embodiment 500 further comprises positioning the distal ends of the inner and outer conduits of the combustion burner at an initial position beyond a wall of the submerged combustion melter (Box 504). Method embodiment 500 further comprises feeding the feedstock into the submerged combustion melter and melting the feedstock using the combustion burner during a first time period during which the inner and outer conduits wear away to a second position closer to the wall of the submerged combustion melter (Box 506). Method embodiment 500 further comprises advancing the inner and outer conduits so that their distal ends are substantially at their initial position (Box 508), and melting the feedstock during a second time period using the combustion burner (Box 510).

Method embodiment 600 comprises (Box 602) melting non-metallic inorganic feedstock using a submerged combustion melter comprising a combustion burner, the combustion burner comprising an annular liquid cooled jacket defining a central longitudinal through passage; at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; the outer conduit having an exterior surface configured along at least a portion thereof with at least two sets of axially spaced dog teeth, one set mating with adjacent dog teeth on one or more dogs connectors secured in the annular liquid cooled jacket. Method embodiment 600 further comprises positioning the distal ends of the inner and outer conduits of the combustion burner at an initial position beyond a wall of the submerged combustion melter (Box 604). Method embodiment 600 further comprises feeding the feedstock into the submerged combustion melter and melting the feedstock using the combustion burner during a first time period during which the inner and outer conduits wear away to a second position closer to the wall of the submerged combustion melter (Box 606). Method embodiment 600 further comprises advancing the inner and outer conduits so that their distal ends are substantially at their initial position (Box 608), and melting the feedstock during a second time period using the combustion burner (Box 610).

Method embodiment 700 comprises (Box 702) melting non-metallic inorganic feedstock using a submerged combustion melter comprising a combustion burner, the combustion burner comprising an annular liquid cooled jacket defining a central longitudinal through passage; at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; one or more locking bolts passing through the annular liquid cooled jacket radially, the locking bolt having a distal end engageable with an external surface of the outer conduit. Method embodiment 700 further comprises positioning the distal ends of the inner and outer conduits of the combustion burner at an initial position beyond a wall of the submerged combustion melter (Box 704). Method embodiment 700 further comprises feeding the feedstock into the submerged combustion melter and melting the feedstock using the combustion burner during a first time period during which the inner and outer conduits wear away to a second position closer to the wall of the submerged combustion melter (Box 706). Method embodiment 700 further comprises advancing the inner and outer conduits so that their distal ends are substantially at their initial position (Box 708), and melting the feedstock during a second time period using the combustion burner (Box 710).

In operation, flow of feedstock (including particulate feedstock) into the SCM may be continuous, semi-continuous, semi-batch, or batch. For example, in certain embodiments feedstock could flow into a feedstock heat exchange substructure until the feedstock heat exchange substructure is partially full or completely full of feedstock, then the pre-heated feedstock may be dumped into the SCM. One way of accomplishing that may be by use of a grating at the bottom of a feedstock heat exchange substructure having openings slightly smaller than the feedstock particle size. Such an arrangement is disclosed in Applicant's copending U.S. patent application Ser. No. 14/844,198 filed Sep. 3, 2015, now U.S. Pat. No. 9,815,726, issued Nov. 14, 2017.

The initial raw material feedstock may include any material suitable for forming molten inorganic materials. In certain embodiments where the feedstock is pre-heated by melter exhaust, some non-particulate feedstock may have a weight average particle size such that most if not all of the feedstock is not fluidized when traversing through the heat exchange structure or exhaust conduit serving as the heat exchange structure. Such materials may include glass precursors or other non-metallic inorganic materials, such as, for example, limestone, glass cullet, feldspar, basalt or other rock wool forming material, and mixtures thereof. Typical examples of basalt that are compositionally stable and available in large quantities are reported in U.S. Patent Publication 2012/0104306, namely an ore having a larger amount of $SiO_2$ (A, for high-temperature applications) and an ore having a smaller amount of $SiO_2$ (B, for intermediate-temperature applications), both of which have approximately the same amount of $Al_2O_3$. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SiO_2$; and (3) a mixture of the high-temperature basalt rock ore (A) and the intermediate-temperature basalt rock ore (B).

Basalt rock (basalt ore) is an igneous rock. According to U.S. Patent Publication 2012/0104306, major examples of the constituent mineral include: (1) plagioclase: $Na(AlSi_3O_8)$—$Ca(Al_2SiO_8)$; (2) pyroxene: (Ca, Mg, $Fe^{2+}$, $Fe^{3+}$, Al, $Ti)_2[(Si, Al)_2O_6]$; and (3) olivine: (Fe, $Mg)_2SiO_4$. Ukrainian products are reported to be inexpensive and good-quality.

Tables 2 and 3 (from U.S. Patent Publication 2012/0104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 2

|    | Ore (for high-temp.) (wt %) | Ore (for intermediate-temp.) (wt %) | Ore (for high-temp.) 85 wt % Ore (for intermediate-temp.) 15 wt % (wt %) |
|----|------------------------------|-------------------------------------|---------------------------------------------------------------------------|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K  | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P  | 0.05~0.10 | 0.05~0.09 | 0.07~0.10 |
| B  | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S  | 0.01~0.03 | 0.01~0.03 | 0.01~0.03 |

TABLE 3

|    | Ore (for high-temp.) (wt %) | Ore (for intermediate-temp.) (wt %) | Ore (for high-temp.) 85 wt % Ore (for intermediate-temp.) 15 wt % (wt %) |
|----|------------------------------|-------------------------------------|---------------------------------------------------------------------------|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

In embodiments wherein glass batch is used as sole or as a supplemental feedstock, one glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass batch compositions may be used, such as those described in Applicant's published U.S. application 2008/0276652.

As noted herein, submerged combustion burners and burner panels may produce violent or aggressive turbulence of the molten inorganic material in the SCM and may result in sloshing or splashing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in Applicant's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of a feedstock feeder may be adjusted through a signal, and one or more of fuel and/or oxidant conduits may be adjusted via a signal, it being understood that suitable transmitters and actuators, such as valves and the like, are not illustrated for clarity.

Metter apparatus in accordance with the present disclosure may also comprise one or more wall-mounted non-submerged combustion burners, and/or one or more roof-mounted non-submerged combustion burners (not illustrated). Roof-mounted burners may be useful to pre-heat the melter apparatus melting zone, and serve as ignition sources for one or more submerged combustion burners and/or burner panels. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, one or more roof-mounted burners could be used supplementally with a baffle (for example, when the baffle requires service) to form a temporary curtain to prevent particulate carryover. In certain embodiments, all submerged combustion burners and burner panels may be oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical (Joule) heating in certain embodiments, in certain melter zones.

Certain SCM embodiments may comprise burner panels as described in Applicant's U.S. patent application Ser. No. 14/838,148 filed Aug. 27, 2015, comprising a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body. Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter. Certain burner panel embodiments may comprise a mounting sleeve. In certain burner panel embodiments the mounting sleeve having a diameter at least sufficient to accommodate the external diameter of the fluid-cooled collar. In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

Suitable materials for glass-contact refractory, which may be present in SCMs, burners, and burner panels useful herein, include AZS (alumina-zirconia-silica), $\alpha/\beta$ alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material may be dictated by the geometry of the apparatus, the type of material being produced, operating temperature, burner body panel geometry, and type of glass or other product being produced.

The term "fluid-cooled" means use of any coolant fluid (heat transfer fluid) to transfer heat away from the equipment in question, other than ambient air that resides naturally on the outside of the equipment. For example, portions of or the entire panels of sidewall structure, floor, and ceiling of the SCM, baffles, portions or all of heat transfer substructures used to preheat feedstock (for example nearest the melter), portions of feedstock supply conduits, and portions of SC burners, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in Applicant's U.S. Pat. No. 8,769,992.

Certain SCM and method embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at melter exhaust exit, pressure of the primary oxidant entering burners or burner panels, humidity of the oxidant, burner or burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes. Flow diverter positions may be adjusted or controlled to increase heat transfer in heat transfer substructures and exhaust conduits.

Various conduits, such as feedstock supply conduits, exhaust conduits, oxidant and fuel conduits of burners or burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Texas.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits.

Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in Applicant's U.S. patent application Ser. No. 14/778,206 filed Sep. 18, 2015. In certain embodiments carbon steel burner conduits may be preferred as a low cost option, it being understood that these conduits most likely will have to be "advanced" more often than noble metal burner conduits, or noble metal tipped burner conduits.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

The total quantities of fuel and oxidant used by burners or burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the melter (and/or Joule heating) will depend upon the efficiency of the preheating of the feedstock in the feedstock heat exchange substructure. The larger the amount of heat transferred to the feedstock, the lower the heat energy required in the melter from the fuel and/or Joule elements. When operating "lean", the combustion ratio is above about 1.0, or above about 1.5, or above about 2.0, or above about 2.5. When operating "rich", the combustion ratio is below about 1.0, or below about 0.9, or below about 0.8, or below about 0.7, or below about 0.6, or below about 0.5, or below about 0.2.

In SCMs, the velocity of the fuel in the various burners and/or burner panel embodiments depends on the burner/burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, or the burner conduit distal ends are positioned too far beyond the wall, flame and/or combustion products might impinge on a melter wall or roof opposite the burner, or cause carryover of melt into the exhaust, or be wasted, which is also not desired. Baffles may be provided extending from the roof, and/or in the melter exhaust conduit, such as in the heat exchange substructure, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more fuel and/or oxidant conduits in the SCM and/or flow channel(s) downstream thereof may be adjustable with respect to direction of flow of the fuel or oxidant or both. Adjustment may be via automatic, semi-automatic, or manual control. Certain system embodiments may comprise a mount that mounts the fuel or oxidant conduit in a burner panel of the SCM and/or flow channel comprising a refractory, or refractory-lined ball joint. Other mounts may comprise rails mounted in slots in the wall or roof. In yet other embodiments the fuel and/or oxidant conduits may be mounted outside of the melter or channel, on supports that allow adjustment of the fuel or oxidant flow direction. Useable supports include those comprising ball joints, cradles, rails, and the like.

Certain systems and processes of the present disclosure may utilize feed batch densification systems and methods as described in Applicant's U.S. patent application Ser. No. 13/540,704 filed Jul. 3, 2012, now U.S. Pat. No. 9,643,869, issued May 9, 2017. Certain SCMs and processes of the present disclosure may utilize devices for delivery of treating compositions such as disclosed in Applicant's U.S. Pat. No. 8,973,405.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1 ; and 0 to about 0.5 percent of a first noble metal; with the balance comprising a second noble metal, or consisting essentially of (or consisting of) a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, or consisting of 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

Embodiments disclosed herein include:

A: A combustion burner comprising:
(a) an annular liquid cooled jacket defining a central longitudinal through passage;
(b) at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; and
(c) the outer conduit having an exterior surface configured along at least a portion thereof with threads mating with adjacent threads on an inner surface of the annular liquid cooled jacket.

B: A combustion burner comprising:
(a) an annular liquid cooled jacket defining a central longitudinal through passage;
(b) at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; and
(c) the outer conduit having an exterior surface configured along at least a portion thereof with at least two sets of axially spaced dog teeth, one set mating with adjacent dog teeth on one or more dogs connectors secured in the annular liquid cooled jacket.

C. A combustion burner comprising:
(a) an annular liquid cooled jacket defining a central longitudinal through passage;
(b) at least one inner conduit and a substantially concentric outer conduit positioned in the through passage, each conduit comprising proximal and distal ends, the conduits configured so that the outer and inner conduits are movable axially, the at least one inner conduit forming a primary passage and the outer conduit forming a secondary passage between the outer conduit and the at least one inner conduit; and
(c) one or more locking bolts passing through the annular liquid cooled jacket radially, the locking bolt having a distal end engageable with an external surface of the outer conduit.

Each of the embodiments A, B, and C may have one or more of the following additional elements in any combination: Element 1: the distal end of the outer conduit extends beyond the distal end of the at least one inner conduit, and both extend beyond a distal end of the annular liquid cooled jacket; Element 2: the distal end of the at least one inner conduit extends beyond the distal end of the outer conduit, and both extend beyond a distal end of the annular liquid cooled jacket; Element 3: the distal ends of the at least one inner conduit and the outer conduit extend an equal distance beyond a distal end of the annular liquid cooled jacket; Element 4: each conduit consists of a material having a wear rate that is less than noble metals when used in a submerged combustion melter; Element 5: the materials is selected from the group consisting of ceramic materials, non-noble metals, and combinations thereof; Element 6: the non-noble metals is carbon steel; Element 7: the outer conduit is noble metal and the one or more inner conduits is a non-noble metal material; Element 8: the annular liquid cooled jacket secured in a burner panel; Element 9: a submerged combustion melter including one or more burner panels of Element 8; Element 10: the conduits are configured so that the outer and inner conduits are movable axially in unison; Element 11: the conduits are configured so that the outer and inner conduits are movable axially separately; Element 12: (a) positioning the distal ends of the inner and outer conduits of the combustion burner at an initial position beyond a wall of the submerged combustion melter; (b) feeding the feedstock into the submerged combustion melter and melting the feedstock using the combustion burner during a first time period during which the inner and outer conduits wear away to a second position closer to the wall of the submerged combustion melter; (c) advancing the inner and outer conduits so that their distal ends are substantially at their initial position; and (d) melting the feedstock during a second time period using the combustion burner.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A combustion burner for submerged combustion comprising:

(a) an annular liquid cooled jacket defining a central longitudinal through passage;
(b) at least one inner conduit and a substantially concentric outer conduit positioned in the through passage, each conduit comprising proximal and distal ends, all conduit distal ends extending beyond a distal end of the annular liquid cooled jacket, the conduits configured so that the outer and inner conduits are movable axially, the at least one inner conduit forming a primary passage and the outer conduit forming a secondary passage between the outer conduit and the at least one inner conduit, the at least one inner conduit and the outer conduit having positions selected from the group consisting of:
  (i) the distal end of the outer conduit extends beyond the distal end of the at least one inner conduit, and
  (ii) the distal end of the at least one inner conduit extends beyond the distal end of the outer conduit; and
(c) the outer conduit having an exterior surface configured along a lower portion thereof with at least two sets of axially spaced dog teeth, one set mating with adjacent dog teeth on one or more dog connectors secured in the annular liquid cooled jacket, the one or more dogs connectors configured to be operable hydraulically between a locked position and a release position, allowing the outer conduit to be repositioned axially relative to the annular liquid cooled jacket.

2. The burner of claim 1 wherein each conduit consists of a material having a wear rate that is less than noble metals when used in a submerged combustion melter.

3. The burner of claim 2 wherein the materials is selected from the group consisting of ceramic materials, non-noble metals, and combinations thereof.

4. The burner of claim 3 wherein the non-noble metals is carbon steel.

5. The burner of claim 1 wherein the outer conduit is noble metal and the one or more inner conduits is a non-noble metal material.

6. The burner of claim 1, the annular liquid cooled jacket secured in a burner panel.

7. A submerged combustion melter including one or more burner panels of claim 6.

8. The burner of claim 1 wherein the conduits are configured so that the outer and inner conduits are movable axially in unison.

9. The burner of claim 1 wherein the conduits are configured so that the outer and inner conduits are movable axially separately.

10. A method of melting non-metallic inorganic feedstock using the submerged combustion melter of claim 7, the method comprising:
  (a) positioning the distal ends of the inner and outer conduits of the combustion burner at an initial position beyond a wall of the submerged combustion melter;
  (b) feeding the feedstock into the submerged combustion melter and melting the feedstock using the combustion burner during a first time period during which the inner and outer conduits wear away to a second position closer to the wall of the submerged combustion melter;
  (c) advancing the inner and outer conduits so that their distal ends are substantially at their initial position; and
  (d) melting the feedstock during a second time period using the combustion burner.

11. A method of melting non-metallic inorganic feedstock using the submerged combustion melter of claim 1, the method comprising:
  (a) positioning the distal ends of the inner and outer conduits of the combustion burner at an initial position beyond a wall of the submerged combustion melter;
  (b) feeding the feedstock into the submerged combustion melter and melting the feedstock using the combustion burner during a first time period during which the inner and outer conduits wear away to a second position closer to the wall of the submerged combustion melter;
  (c) advancing the inner and outer conduits so that their distal ends are substantially at their initial position; and
  (d) melting the feedstock during a second time period using the combustion burner.

* * * * *